INVENTORS
Bobby L. McKie
Whitten P. Lloyd

United States Patent Office 2,852,909
Patented Sept. 23, 1958

2,852,909
ESCAPEMENT REGULATOR

Bobby L. McKie, Elgin, and Whitten P. Lloyd, Palos Park, Ill., assignors to Wheaton Engineering Corporation, Wheaton, Ill., a corporation of Illinois Application July 29, 1954, Serial No. 446,482

7 Claims. (Cl. 58—109)

This invention relates to means for regulating a clockwork mechanism which incorporates a balance spring as part of an escapement.

In general, the balance spring is of volute or helical spiral form or a combination of both. Sometimes the spring takes special exterior configurations, such as spherical. In any of these cases regulation may be obtained by changing the spring constant, as by altering the point of attachment of the outermost coil of a volute spring.

Heretofore such desideration has been attained by the use of means which physically abut on the coil on both faces thereof and which have unduly complicated the time-keeping mechanism or have been of such character as readily to damage the spring, for example, a pair of curb pins pinching the spring between them.

The principal object of this invention resides in providing regulating means which coacts magnetically with a turn of the balance spring, e. g., the outer coil of a volute spring and omits any parts which mechanically interact with or embrace the spring thereby to eliminate those faults of prior arrangements which were a frequent source of difficulty.

Heretofore the presence of a magnetic field about a time keeping mechanism including a steel or other ferromagnetic balance spring has been regarded as detrimental to accurate time keeping since inevitably magnetization of the spring would occur and the resultant more or less permanent field affected the spring rate. However, we have found that, by the use of a permanent magnet of proper dimensions and configuration, suitably magnetized, the same may be employed to fix the outer coil of a balance spring in the same manner as those means heretofore customary, e. g., curb pins. Moreover, since the magnet is designed to direct the major portion of its available field transversely of the spring it is effective to hold the selected point of the spring indefinitely while permitting movement of the magnet along the length of the spring without the danger of buckling or otherwise deforming the same. We are fully cognizant that the gist of the invention goes counter to a proposition long adhered to by watchmakers, but when the invention is practiced in accordance with the disclosure herein protracted tests in connection with electronic timing apparatus of accepted accuracy reveals no practical beat error.

Broadly regarded the invention, in one aspect, comprehends the use of a bi-polar permanent magnet having its poles arranged to abut a coil, e. g., the outer coil, of the spring and mounted for movement along the length of the coil by an arm forming part of the index. In another aspect the invention includes a novel configuration of the magnet for avoiding the effects of leakage flux and to insure that the greatest possible amount of available flux is directed to the useful purpose.

In the drawing, which discloses a preferred mode of applying the invention in practice:

Figure 1:
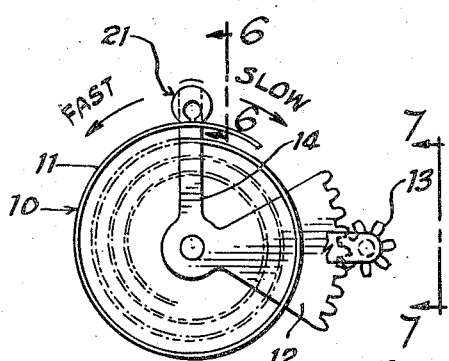
Fig. 1 is a somewhat simplified elevational view of a volute spring in combination with the invention regulator.
Figure 2:
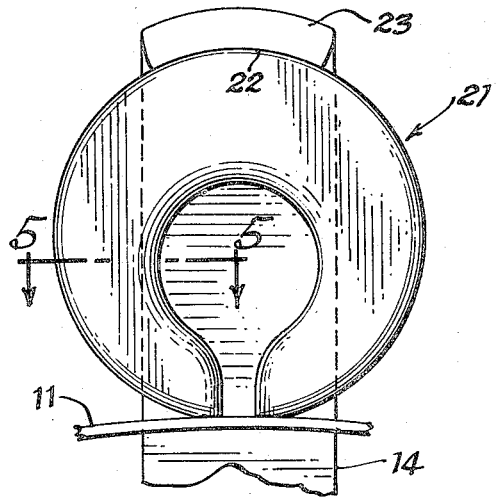
Fig. 2 shows a portion of Fig. 1 but greatly enlarged for clarity.
Figure 7:
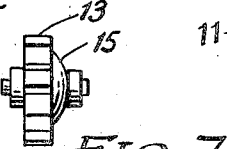
Fig. 7 is a view on the line 7—7 to show the means for maintaining a selected position of the regulator.

Turning to this drawing the numeral 10 indicates a volute balance spring and 11 its outer coil. From what follows it will become obvious that the overall shape of the spring is not to be regarded as limited, inasmuch as the gist of the invention resides in fixing a balance spring at some point in its length. Any suitable index means such as sector 12 and pinion 13 may be utilized to carry an arm 14 to which the permanent magnet 21 is secured by soldering, pinning or otherwise. It will be understood that friction washer means or its equivalent is employed to maintain the index in a selected position and as is common in this art, for example, a dished resilient washer 15 intermediate the pinion 13 and the framework of the movement. By way of example the magnet is indicated as soldered at 22 to a turned-over ear 23 of the arm 14.

Figure 3:
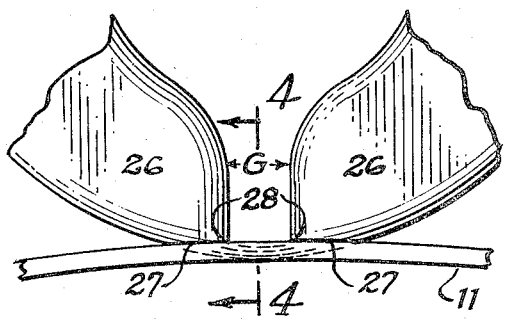
Fig. 3 is a partial view to indicate a preferred manner of shaping the poles and their active faces.
Figure 4:
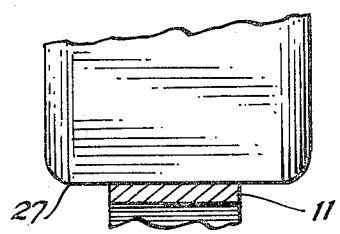
Fig. 4 shows a cross section on the line 4—4 of Fig. 3.
Figure 5:
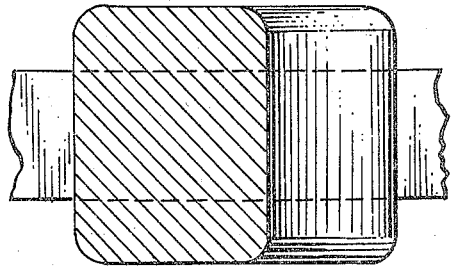
Fig. 5 shows a cross section on the line 5—5 of Fig. 2.
Figure 6:
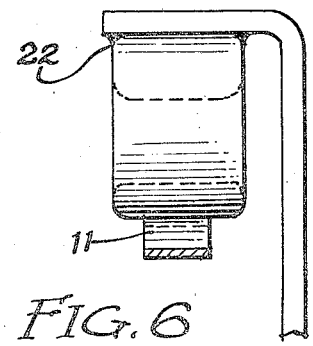
Fig. 6 is a cross section taken along the line 6—6 of Fig. 1, but greatly magnified.

Also by way of example the magnet 21 is shown as horse shoe in shape although other forms of magnet may be found equally suitable. Referring to Fig. 3 the poles 26 are preferably conformed at their active faces 27 congruently with the curvature of that portion of the spring over which regulation occurs in order that any air gap otherwise occasioned by mismatch is a practically irreducible minimum.

In order that leakage flux may be minimized and the flux concentrated to the greatest possible extent across the faces 27—27 all portions of the magnet other than the corners 28—28 are chamfered or rounded as shown. This expedient recognizes the well known proposition that the flux density is inversely proportional to the radius of curvature so that the conversion of a sharp corner into an arcuate surface reduces the leakage flux. The width of the gap G is somewhat empirically determined and will obviously be a function of the flux available in its relation to the permeability of the spring material. In any case the smaller the gap the greater the concentration of flux at the active area whereat the faces 27—27 and the coil 11 abut.

From the foregoing the function of the invention regulator is believed to be apparent, namely, by movement of the arm 14 through the mechanism shown or an equivalent index the point of engagement of the magnet and spring can be varied over any desired range without the complications attendant upon the use of curb pins or other hitherto-employed devices which mechanically engage the spring.

Carefully supervised tests have demonstrated that the magnet may be so designed and magnetized in its relation to the pertinent radial component of spring force as to maintain proper tactual relation therewith without deleterious effects on the spring rate.

While we have shown a particular embodiment of our invention, it will be understood, of course, that we do not wish to be limited thereto since many modifications may be made, and we therefore contemplate by the appended claims to cover any such modifications as fall within the true spirit and scope of our invention.

We claim:

1. Regulating mechanism for a repetitive time rate mechanism which includes a ferromagnetic spring for controlling the period comprising a magnet having at least one pole thereof in sliding abutment with the spring whereby the spring is attracted by the magnet and oscillation of the spring in a region adjacent the zone of abutment neutralized in both directions and the spring rate thereby regulated, and adjustable means for supporting and moving said magnet along the spring.

2. Regulating mechanism in accordance with claim 1 further characterized by means for retaining said means in a selected, adjusted position.

3. Regulating mechanism in accordance with claim 1 wherein the magnet is substantially horse shoe-shaped and the two poles thereof abut the spring.

4. Regulating mechanism in accordance with claim 3 wherein the abutting portions of the poles are provided with a surface configuration substantially congruent with that portion of the spring over which the regulating range extends.

5. Regulating mechanism in accordance with claim 1 wherein the abutting portion of the pole is provided with a surface configuration substantially congruent with that portion of the spring over which the regulating range extends.

6. Regulating mechanism in accordance with claim 1 wherein the corners of the magnet defining the active pole face thereof are square and the remaining corners are chamfered to reduce leakage flux in zones removed from the active zone of the magnet.

7. Regulating mechanism for a repetitive time rate mechanism which includes a ferromagnetic coil spring for controlling the period comprising a magnet having at least one pole thereof in sliding abutment with a coil of the spring whereby the spring is attracted by the magnet and oscillation of the spring in a region adjacent the zone of abutment neutralized in both directions and the spring rate thereby regulated, and adjustable means for supporting and moving said magnet along the spring.

References Cited in the file of this patent

UNITED STATES PATENTS 2,399,297    Rudolph _____ Apr. 30, 1946

FOREIGN PATENTS 21,474    Switzerland _____ Apr. 17, 1900